Oct. 6, 1970 K. R. KAPLAN 3,532,897

THRESHOLD GATE CIRCUITS

Filed June 7, 1967

INVENTOR

KENNETH R. KAPLAN

BY John V. Regan

ATTORNEY

United States Patent Office 3,532,897
Patented Oct. 6, 1970

3,532,897
THRESHOLD GATE CIRCUITS

Kenneth R. Kaplan, East Brunswick, N.J., assignor to RCA Corporation, a corporation of Delaware Filed June 7, 1967, Ser. No. 644,150
Int. Cl. H03k 19/42
U.S. Cl. 307—211 9 Claims

ABSTRACT OF THE DISCLOSURE

Threshold gates are interconnected to operate as a triggerable flip-flop in J–K, Set-Reset and Data Entry Forms. The flip-flop uses a trigger signal in combination with input signals and feedback signals representing outputs of some of the gates either to store digital values in the flip-flop or to change the stored digital values.

BACKGROUND OF THE INVENTION

In threshold logic, a common circuit element is a threshold gate. Signals representing binary digits are applied to respective input leads to the gate, each such signal having an effective "weight" of one or some multiple of one. The output signal produced by the gate is indicative of whether the threshold of the gate has been exceeded.

A majority gate may be defined as a threshold gate which has applied thereto an odd number "*n*" of input signals, each of "weight" one, has a threshold of $$\frac{n+1}{2}$$

and produces an output signal indicative of the value of the majority of the input signals. A minority gate may then be defined as a threshold gate which has applied thereto an odd number "*n*" of input signals, each of "weight" one, has a threshold of $$\frac{n+1}{2}$$

and produces an output signal indicative of the value of the minority of the input signals. A majority-minority gate produces two output signals, one indicative of the majority function and the other indicative of the minority function and complementary to the first output signal. Obviously, a majority-minority gate could be substituted for either of the other two threshold gates with the undesired output signal left unconnected.

An example of the implementation of a majority-minority gate, which may be in integrated circuit form, may be found in Pat. No. 3,403,267 of Robert O. Winder, issued on Sept. 24, 1965 and assigned to the same assignee as the present invention. Additional threshold gate logic circuits may be found in Pat. No. 3,456,126 of Kenneth R. Kaplan, issued on July 15, 1969 and assigned to the same assignee as the present invention.

BRIEF SUMMARY OF THE INVENTION

The present invention is directed to a triggerable flip-flop using threshold gate circuits. Broadly, the circuit uses a plurality of interconnected threshold gates and means for applying a trigger signal to two of the gates with a signal value representing either a binary "1" or "0." A second signal is also applied to the same two gates as the trigger signal with sufficient weight than when the second signal and the trigger signal represent the same binary value, the information stored in the flip-flop retains its previous value and when the second and trigger signals represent other binary values, the information stored in the flip-flop may be changed.

In an embodiment of the invention operative as a J–K flip-flop, a "J" signal is applied to one of the two gates and a "K" signal to the other of the two gates for affecting the values of the output signals produced by the interconnected threshold gates when the trigger signal represents the other binary value from the second signal. Another embodiment includes a modification of the above structure wherein a data signal is introduced by another threshold gate to change the output signal of the flip-flop to conform to the data signal when a gating signal is applied to the flip-flop.

BRIEF DESCRIPTION OF THE DRAWING

A better understanding of the present invention may be had when the following detailed description is read in connection with the accompanying drawings wherein like reference characters denote like components, and.

DETAILED DESCRIPTION OF THE INVENTION

Figures 1, 2, 3, 4:
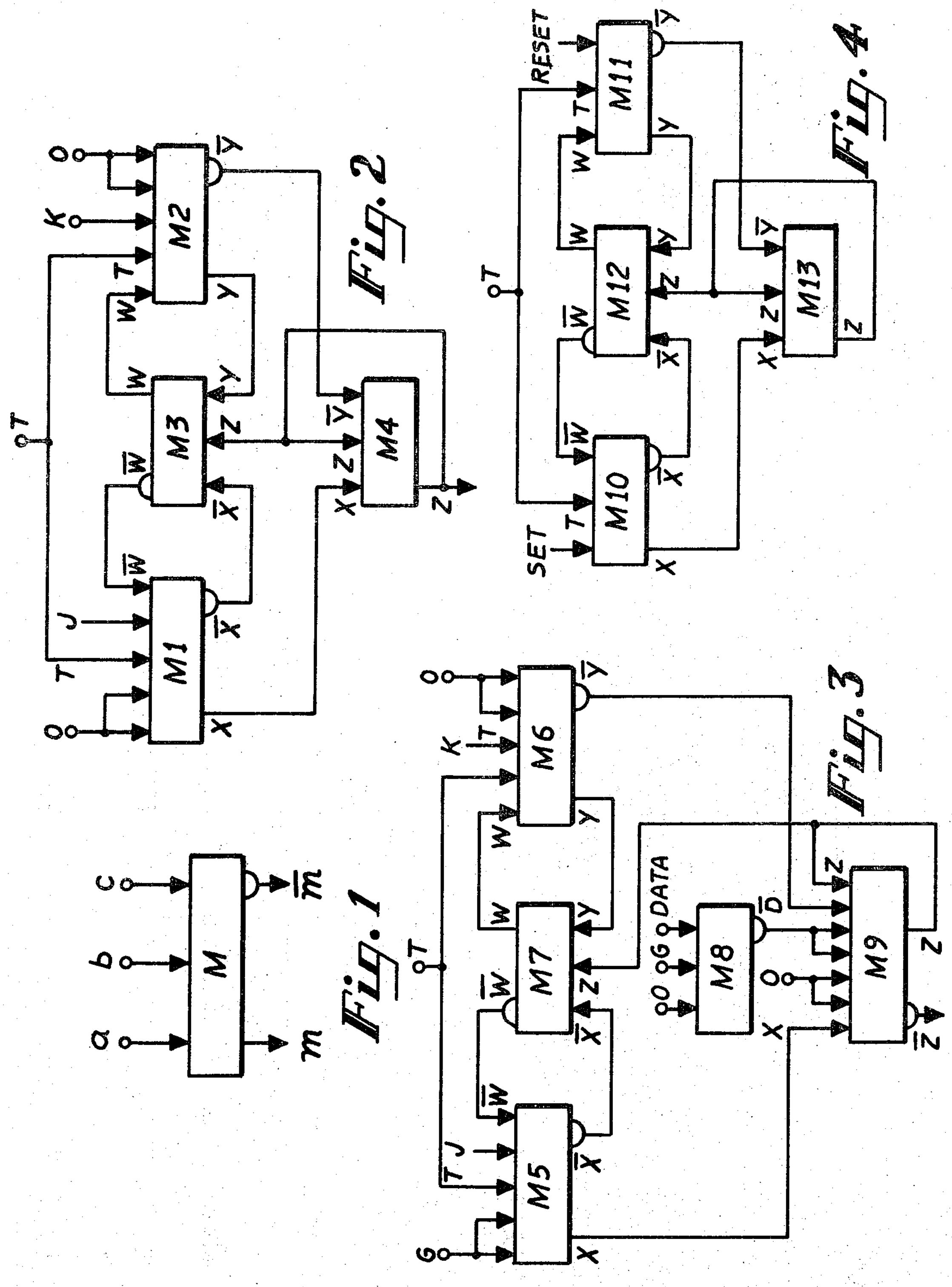
FIG. 1 is a block diagram of a gate element employed in the remaining figures.
FIG. 2 is a block diagram of a triggerable J–K flip-flop according to the present invention.
FIG. 3 is a block diagram of a modification of the circuit of FIG. 2.
FIG. 4 is a block diagram of a further modification of the circuit of FIG. 2.

FIG. 1 shows a majority-minority gate having three inputs, each with a "weight" of one. An input signal may be applied with twice the effect, or weight, on the gate by applying the same input signal to two input terminals. Alternatively, an input terminal may be a double weight input terminal, in the case of a transistor gate, by having in series therewith a resistor which is effectively half of the value of the resistor in series with another input terminal.

The J–K flip-flop of FIG. 2 includes four threshold gates interconnected as shown. A first gate M1 receives a fixed bias of weight of 2 representing the binary digit "0," a trigger signal "T," a first control signal "J" and a fourth input signal "W." A second gate M2 receives the bias signal representing the binary value "0" with a weight of 2, the trigger signal "T," a second control signal "K" and a fourth input signal "W." A third gate M3 receives the complementary output signal "$\overline{X}$" from the first gate M1, an output signal "Y" from the second gate M2 and a third input signal Z to produce an output signal W and its complement $\overline{W}$, respectively. A fourth gate M4 receives the output signal "X" from the first gate M1, the output signal "$\overline{Y}$" from the second gate M2 and a third input signal Z which is the same as the third input signal for the third gate M3. This common third input signal is a majority output signal from the fourth gate M4.

In the operation of the circuit of FIG. 2, the trigger signal "T" samples the combined binary value of the J and the K signals. In other words, when $T=0$, the circuit stores its prior output signal "Z," regardless of the values of the J and K signals. When $T=1$, the output signal Z depends on the combined state of the J–K signals. Briefly, the operation, when $T=1$, may be summarized as follows. When $J=1$ and $K=0$, hereinafter referred to as $$J\text{–}K=1\text{–}0$$

the output Z is unconditionally set to "1." When $$J\text{–}K=0\text{–}1$$

the output Z is unconditionally set to "0." If $J$–$K=1$–$1$, the circuit unconditionally changes from its previous state. Finally, when $J$–$K=0$–$0$, then no output change occurs when $T=1$.

In a more detailed description of the operation of the circuit from an initial state when $T=0$, it can be seen that the majority output from the first gate M1 is $X=0$ since the majority of the input weights are "0." Similarly, $Y=0$, and the Z output is fixed, or stored, because $X=0$, $\overline{Y}=1$ and, therefore, $Z=Z$. When $J$-$K$=0–0 and T is made equal to "1" ($T\rightarrow 1$), the M1 output is $X=0$ representing the majority of the input weights, the M2 output similarly is $Y=0$ and the output Z is left at its prior state because the input weights to M4 are $X=0$, $\overline{Y}=1$, and Z.

When $J$-$K$=1–0, and $T\rightarrow 1$, then $X\rightarrow\overline{W}$ since the bias and the J and T inputs to M1 are equally divided between "0" and "1" so that the $\overline{W}$ input controls the value of the X output. On the other hand, the majority of the input weights for M2 are "0" and, therefore, $Y=0$. It may also be seen that, under the foregoing conditions, $X=\overline{Z}$. For example, if $Z=0$, initially then the majority of the input weights to M3 are "0" since $Z=Y=0$ and $\overline{W}=1$ so that $X=1$. When $X=1$, since $\overline{Y}$ also is 1, Z changes to 1. However Y and X are both 0 so that $\overline{W}$ remains 1. When $Z=1$ initially, since $\overline{Y}$ is also 1, Z continues to be 1. Accordingly, regardless of the initial value of Z, when $J$-$K$=1–0 and $T\rightarrow 1$, $Z\rightarrow 1$, unconditionally The operation of the circuit when $J$-$K$=0–1 and $T\rightarrow 1$, is complementary to that discussed above. With respect to gate M2, as $K=T=1$, and the bias of weight 2 is equal to 0, $Y=W$. As the majority of the input weights to gate M1 represent the value 0, $X=0$. If $Z=0$ initially, $$Z=X=0$$

and gate M4 continues to produce an output $Z=0$. If $Z=1$ initially, as $\overline{X}$ is also 1, gate M3 produces an output $W=1$. This makes the $\overline{Y}$ output of gate M2 equal to 0. Now, as both X and $\overline{Y}$ are 0, Z changes to 0. This does not effect the $W=1$ output of gate M3 since both $\overline{X}$ and Y have the value 1.

In the operation of the circuit when $J=K=1$, assume that T initially is 0. Under this set of conditions, $\overline{X}=1$ and $Y=0$. If Z, the information stored by gate M4, initially represents the value 1, then $Z=\overline{X}=1$ and the majority output of gate M3 is $W=1$. In a similar manner, if Z is initially 0, then $Z=Y=0$ and the output of gate M3 is $W=0$.

The two cases above will be treated separately to show what occurs when T changes to 1. In the first case, that is, $Z=1$ and $W=1$, initially, when T changes to 1, Y changes to 1 and $\overline{X}$ remains 1. Y becomes 1 because $$T=K=1$$

balances the 0 bias input of weight 2 so that $Y=W=1$. In a similar manner, in gate M1, $T=J=1$ and the bias equals 0 so that $\overline{X}=W=1$. Therefore, $X=0$ and $\overline{Y}=0$ making two of the three input weights to gate M4 equal to 0 so that the output of gate M4 changes to $Z=0$. The change in Z from 1 to 0 does not affect gate M3 since $\overline{X}$ and Y both equal 1. To summarize this portion of the circuit operation, when Z initially is 1 and $J=K=1$ and $T\rightarrow 1$ then Z switches to 0.

In the second case above, $Z=0$ and $W=0$ initially. Now when T changes to 1, the output of gate M2 is $Y=0$ and as $\overline{W}=1$ the output of gate M1 is $\overline{X}=0$. Now two of the three input weights to gate M4 represent ones ($X=1$, $\overline{Y}=1$) so that Z switches to 1 . Again, this does not affect gate M3 since $\overline{X}$ and Y are both 0. Summarizing this aspect of the circuit operation, if Z initially is equal to 0 and if $J=K=1$ and $T\rightarrow 1$, Z changes to 1.

A modification of the circuit discussed above is shown in FIG. 3. A fifth threshold gate M8 is added for the purpose of entering data from a data bus. This data input terminal to gate M8 is labeled "data" in the figure. The output gate is changed to a seven input threshold gate M9 with double weight connections for two of its input signals which may also be thought of as a five input gate with each of two input terminals having double weights. A gate control signal G is applied to a first threshold gate

M5 in place of the "0" bias signal used for the first gate M1 in FIG. 1 and is used to selectively gate the data signal into the flip-flop. The fifth gate M8 is arranged to have single weight inputs of G, data and a "0" bias signal.

When $G=0$, the sixth, or output, gate M9 functions as a three input threshold gate since the output signal $\overline{D}$ from the fifth gate M8 is "1" to balance out the double weight 0 bias signal, and the operation is as previously described for FIG. 2.

When $G=1$, the sequence of operation depends on the prior state of Z since the initial value of W is dependent on Z. Thus, when $G=T=J=K=0$ and $Z=1$, the inputs to the third gate M7 are $\overline{X}=1$, $Y=0$, $Z=1$, so that $W=1$. On the other hand, if $Z=0$, then the inputs to M7 are $\overline{X}=1$, $Y=0$, $Z=0$, and $W=0$. When $W=0$ and $G=1$, $Y=0$ and $X=1$ regardless of T, J and K. The output gate M9 then has inputs, reading from left to right, of 1, 0, 0, $\overline{D}$, $\overline{D}$, 1 and 0, so the output $Z\rightarrow\overline{D}$. The flip-flop output may be taken from $\overline{Z}$ so that $\overline{Z}=D$.

If $Z=1$ initially, then $W=1$ as discussed above and, when $G\rightarrow 1$, Y can be either 0 or 1 depending on T and K while X can also be either 0 or 1 depending on T and J. However, if $X=0$ then Y must be 0 since to make $X=0$ for $G=1$ and $\overline{W}=0$, $T=J=0$ must be applied to the first gate M5 while if $T=0$ at the second gate M6, then the input majority thereto is 0 and $Y=0$. Thus, the effect on the output gate M9 of the inputs from the first and second gates M5, M6 is to supply an X input which can be either 1 or 0 while the $\overline{Y}$ input can be either 1 or 0 when $X=1$ but only 0 when $X=0$. In summary, if $Z=1$ initially when $G\rightarrow 1$, the lower gate M9 receives a set of inputs depending on T, J and K, i.e., it receives either, reading from left to right, 1, 0, 0, $\overline{D}$, $\overline{D}$, 1, 1 or 1, 0, 0, $\overline{D}$, $\overline{D}$, 0, 1 or 0, 0, 0, $\overline{D}$, $\overline{D}$, 1, 1. In all cases, the majority output "Z" goes to "$\overline{D}$."

A feature of this circuit is that the input information signal may be handled in one cycle of the circuit operation; i.e., upon the application of the data gate signal, the information signal, which may already be present, is immediately processed.

A limiting case of the circuit of FIG. 2, a triggerable set-reset flip-flop, is shown in FIG. 4. It results when J and K are made equal to 1 to effectively cancel one of the 0 bias signals for each of gates M1 and M2 of FIG. 2. Threshold gates M1, M2, now become equivalent to three input majority-minority gates and are so shown at M10, M11 in FIG. 4. The interconnecions of the circuit of FIG. 4 are the same paths as those previously described for FIG. 2. The input signals to the first gate M10 are two previously discussed signals, namely the trigger signal T, and the circuit signal $\overline{W}$ and the remaining signal. rather than being a fixed bias of value 0, is a "set" signal which normally has the value 0 but which is changed to 1 when it is desired to "set" the circuit. Similarly, the input signals to the second gate M11 are the trigger signal T, the circuit signal W and a third or "reset" signal which also normally has the value 0 but which is changed to 1 when it is desired to "reset" the circuit.

The overall operation of the circuit shown in FIG. 4 is that of a triggerable set-reset flip-flop. Briefly, each application of a "1" value trigger signal while set=reset =0 is effective to change the prior state of the output signal Z from the gate M13. On the other hand, if reset=$T=0$, then if set$\rightarrow 1$, $Z=1$ and, conversely, for the conditions of set=$T=0$, if reset$\rightarrow 1$, then $Z=0$.

If $Z=0$ initially and set=reset=$T=O$, then the majority of the inputs for the first gate M10 represent the value 0 and $X=0$. Similarly, the majority of the inputs to the second gate M11 represent a 0 value and $Y=0$. The majority of the inputs to the third gate M12 represent the value 0 and $W=0$. Now, if $T\rightarrow 1$, the majortiy of the inputs to the first gate M10 represent the value 1 and $X=1$. Conversely, the input majority to the second gate M11 represents the value 0 and $Y=0$. Since $X=0$ and $Y=0$, the majority of the inputs to the third gate M12 are 0 and $W=0$ is retained. Since $X=1$ and $Y=1$, the majority of the inputs to the fourth gate M13 are 1 and $Z\to 1$.

Now, if $T\to 0$, the majority of the inputs to the first gate M10 are 0 and $X=0$, and the majority of the inputs to M11 are 0 and $\overline{Y}=1$, so that $Z=1$ is stored. On the other hand, the majority of inputs to the second gate 12 are 1 since $Z=\overline{X}=1$ and $W\to 1$. If T is again made to represent the value of 1, the majority of the inputs to first gate M10 are 0 and $X=0$. The majority of the inputs to the second gate M11 are 1 and $Y=1$. Since $X=\overline{Y}=0$, the majority input to the third gate M13 is 0 and $Z\to 0$. If $T\to 0$, then the input majority to gate M10 is 0 and $X=0$ and, similarly, $Y=0$. The inputs to the third gate are now $\overline{X}=1$, $Z=0$, and $Y=0$ so that $W\to 0$ and the circuit is back to the initial state for a new trigger cycle by T.

If $T=Z=0$ initially and set$\to$1, the input majority to the first gate M10 is 1 since $\overline{W}=1$ following the initial conditions of set=reset=$T$=0 previously described. As a result, $X=1$. The input majority to the second gate M11 is 0 and $\overline{Y}=1$ so that the input majority to the fourth gate M13 is 1 and $Z\to 1$. Since $\overline{X}=0$ and $Y=0$, the majority input to the third gate M12 is 0 and $W=0$ is retained. When set$\to$0, the inputs to the fourth gate M13 are $X=0$, $\overline{Y}=1$, $Z=1$ and accordingly, $Z=1$ is stored, while the inputs to the third gate M12 are $\overline{X}=Z=1$ and $W\to 1$.

If $Z=1$ initially and reset$\to$1 while $T=0$, then the input majority to the first gate M10 is 0 since set$=T=\overline{W}=0$ and $X=0$, while the input majority to the second gate M11 is 1 since $T=0$ and reset$=W=1$. As a result, $Y=1$ and the input majority to the fourth gate M13 is 0 since $X=\overline{Y}=0$ and $Z\to 0$. This has no effect on the third gate M12 since $\overline{X}=Y=1$. When reset$\to$0, the majority inputs to the first gate M10 are 0 since set$=T=W=0$ and $X=0$ while the input majority to the second gate M11 is 0 since $T$=reset=0 and $Y=0$. Since $Z=0$, the input majority to the third gate M12 is 0 and $W=0$. This has no effect on the first and second gates M10 and M11 and $Z=0$ is stored.

In summary, the circuit shown in FIG. 4 functions as a triggerable set-reset flip-flip wherein the trigger input when $T=1$ unconditionally changes the value of the flip-flop output signal while the set input when set=1 unconditionally sets the output to a value representing a binary 1 while the reset input when reset=1 sets the output to a binary 0 value. The use of similar gates throughout the circuit of FIG. 4 is effective to make this circuit readily adaptable for large-array integrated circuit fabrication.

What is claimed is:

1. A flip-flop comprising, in combination:

a plurality of interconnected threshold gates;

means for applying a trigger signal with a corresponding weight to two of said gates which signal can assume a value representing either a binary 1 or 0;

means for applying a bias signal to the same two gates as said trigger signal with sufficient weight such that when it and the trigger signal represent the same binary value, the outputs of all gates unconditionally retain the information they were previously storing; and means for applying a first signal to one of said two gates and a second signal to the other of said two gates for affecting the values of the output signals produced by the interconnected threshold gates when said trigger signal represents its other binary value.

2. A logic circuit comprising a first threshold gate having majority-minority output signals, means for applying to said first threshold gate a first bias signal with a weight of 2, a trigger signal, a first control signal and a first circuit derived signal, a second threshold gate, means for applying to said second gate a second bias signal with a weight of 2, said trigger signal, a second control signal and a second circuit derived signal complementary to said first signal, a third threshold gate, means for applying to said third gate a minority output signal from said first gate, a majority output signal from said second gate and a third circuit signal, a fourth threshold gate, and means for applying to said fourth gate a majority output signal from said first gate, a minority output signal from said second gate and said third circuit signal, said third signal being the majority output signal from said fourth gate.

3. A logic circuit as set forth in claim 2, wherein said first and second circuit signals are the minority and majority output signals from said third gate, respectively.

4. A logic circuit as set forth in claim 2, wherein said gates each have a threshold of $$\frac{n+1}{2}$$

where $n$ is an odd integer representing the total weight of the gate input signals.

5. A logic circuit as set forth in claim 2, wherein said first and second bias signals are the same signal.

6. A logic circuit as set forth in claim 2, and including a fifth threshold gate, means for applying to said fifth gate said first bias signal, said second bias signal and an input data signal, and means for applying to said fourth threshold gate the minority output signal from said fifth gate and said second bias signal, each with a weight of 2.

7. A triggerable flip-flop comprising: a plurality of interconnected threshold gates, means for applying a trigger signal to two of said gates which signal can assume a value representing either a binary 1 or 0, means for applying a second signal to the same two gates as said trigger signal with sufficient weight such that when said second signal and said trigger signal represent the same binary value, the output signals of all the gates unconditionally retain the information they were previously storing, and when said trigger signal represents a predetermined binary value and said second signal represents an opposite binary value from said trigger signal, the information stored in said gates is available for change.

8. A logic circuit as set forth in claim 7, wherein said gates each have a threshold of $$\frac{n+1}{2}$$

where $n$ is an odd integer representing the total weight of the gate input signals.

9. A triggerable flip-flop as set forth in claim 7, wherein all of said gates are three input gates.

References Cited

UNITED STATES PATENTS

| | | | |
|---|---|---|---|
| 3,381,232 | 4/1968 | Hoernes et al. | 328—206 |
| 3,403,267 | 9/1968 | Winder | 307—211 X |
| 3,434,058 | 3/1969 | Winder | 307—211 X |

JOHN S. HEYMAN, Primary Examiner

R. C. WOODBRIDGE, Assistant Examiner

U.S. Cl. X.R.

307—289; 328—92, 206